United States Patent [19]
Sjöberg

[11] Patent Number: 6,123,969
[45] Date of Patent: *Sep. 26, 2000

[54] METHOD FOR DEOXYGENATING FOOD PRODUCTS

[75] Inventor: Elisabeth Sjöberg, Lund, Sweden

[73] Assignee: Nestec S.A., Vevey, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/844,136

[22] Filed: Apr. 18, 1997

[30] Foreign Application Priority Data

May 7, 1996 [EP] European Pat. Off. ............. 96201130

[51] Int. Cl.[7] ............................. B65B 31/02; A21D 2/00
[52] U.S. Cl. ..................... 426/410; 426/418; 426/486; 426/413; 426/128; 53/432; 53/433; 53/434
[58] Field of Search .................... 426/404, 486, 426/399, 410, 413, 418, 128; 53/432–434

[56] References Cited

U.S. PATENT DOCUMENTS

| | | | |
|---|---|---|---|
| 2,044,639 | 6/1936 | Schneider | 426/486 |
| 2,076,459 | 4/1937 | Hanson | 426/404 |
| 2,327,732 | 8/1943 | McKinnis | 426/399 |
| 2,335,192 | 11/1943 | Moore | 426/404 |
| 2,363,445 | 11/1944 | Shipstead | 426/404 |
| 2,517,565 | 8/1950 | Huzenlaub | 426/399 |
| 2,549,216 | 4/1951 | Martin | 426/399 |
| 2,830,911 | 4/1958 | Fogelberg | 426/486 |
| 3,266,905 | 8/1966 | Baker et al. | 426/486 |
| 3,274,746 | 9/1966 | James et al. | |
| 3,449,134 | 6/1969 | Leasure et al. | 426/486 |
| 3,545,983 | 12/1970 | Woods | |
| 3,821,448 | 6/1974 | Paker et al. | 426/486 |
| 3,875,318 | 4/1975 | Davies | 426/399 |
| 3,942,301 | 3/1976 | Domke | |
| 3,970,763 | 7/1976 | Patrick et al. | 426/399 |
| 3,987,209 | 10/1976 | Jacques et al. | 426/404 |
| 4,935,255 | 6/1990 | Anderson et al. | 426/399 |
| 4,997,664 | 3/1991 | Williams | |
| 5,084,284 | 1/1992 | McDilda | 426/404 |
| 5,384,147 | 1/1995 | Hilpert | 426/404 |

FOREIGN PATENT DOCUMENTS

| | | |
|---|---|---|
| 242280 | 10/1987 | European Pat. Off. |
| 1258527 | 3/1961 | France |
| 1012369 | 12/1965 | United Kingdom |
| 2086834 | 5/1982 | United Kingdom |

*Primary Examiner*—Steven Weinstein
*Attorney, Agent, or Firm*—Pennie & Edmonds LLP

[57] ABSTRACT

The present invention relates to a method for deoxygenating a food product and packing it. This method includes the steps of supplying one or more products to an evacuation chamber, evacuating oxygen from the chamber for deoxygenating the chamber and the product or products, injecting protective gas into the chamber to replace at least part of the oxygen evacuated from the product and chamber with protective gas, and transferring the products to a packing unit and sealing it in a package. The invention also relates to an apparatus for such as purpose and to deoxygenated food package.

11 Claims, 2 Drawing Sheets

METHOD FOR DEOXYGENATING FOOD PRODUCTS

TECHNICAL BACKGROUND

The present invention relates to a method and an apparatus for deoxygenating a food product and packing it. The apparatus and method according to the invention are particularly suitable for deoxygenating and flow-wrapping oxygen sensitive products such as dough products, folded food products or products of complex structure enveloping air. The invention also relates to a deoxygenated food package.

For the storage of food products sealed in packages, the level of oxygen in the package may be determinative for the life of the product. This is especially the case for oxygen sensitive products such as fresh or uncooked dough products, meat products etc. Hence, the release of oxygen in the package decreases the life of the product. Such a release of oxygen can often be observed by an inflation of the package.

To decrease the oxygen within a package it is known to gas flush the package containing the product before sealing it. When packing pulverized products, gas flushing of the product immediately prior to the packing is known. In this way, the atmosphere in the head space above and around the product is replaced with a suitable gas such as nitrogen or carbon dioxide.

This kind of replacement of the atmosphere in a food package containing a product does, however, suffer from the drawback that oxygen in the product will be developed a few hours after packing of the product with the undesirable effect of the oxygen as discussed above.

This problem is substantial when packing dough based products as a result of the level of oxygen content in the product and release thereof. Food products of complicated structure or folded products encapsulating pockets of air give also additional oxygen in the package.

Prior art packing machines aim to reduce the level of oxygen in the package by subjecting the package containing the product to a vacuum possibly followed by subsequently flushing the package and product with a suitable gas. For example, evacuating the atmosphere from pouches containing products can take place in a Flow-wrap machine before sealing the pouches. In a Flow-wrap machine, pouches are shaped around a mandrel from one reel of foil and welded into pouches. Due to the evacuation of the atmosphere, the pouch is sucked close to the product and creates a "vacuum" packing of the product. The evacuation of each package reduces the packing capacity of the machine considerably and it is therefore generally only used for bigger items e.g. steaks. This packing method has therefore been considered unsuitable for many purposes due to the relatively low capacity of a maximum of 8 to 10 packing cycles/min.

The evacuating principle is also employed in thermoshaping packing machines such as a Multivac™ in which trays are formed from a lower plastic foil. The trays are filled with food products and then the atmosphere around the tray with the product therein is evacuated. Immediately following the evacuation, the tray and food product are flushed by gas and an upper plastic foil is applied to seal off the tray. The Multivac™ type of packing requires large amounts of packing material. For example, the thickness of the packing base material of the Multivac™ is about 500 $\mu$m while the foil used for the flow wrap packing is about 80 $\mu$m.

SUMMARY OF THE INVENTION

Consequently, it is the aim of the present invention to provide a high speed method and an apparatus for packing food products, especially oxygen sensitive food product and food products with a high oxygen content. Thus, an embodiment of the present invention relates to a flow-wrap method and apparatus which may run with an average speed of about 80 packing cycles/min. This method and apparatus provide low oxygen content packages and allow for a reduction in the amount of the packing material used. Advantageously, the method and apparatus according to the invention may also be used for products of a complex structure or folded or rolled products which may encapsulate pockets of air. Furthermore, the present invention provides a deoxygenated food package which is easily openable.

Accordingly, the present invention relates to a method for deoxygenating a food product and packing it by supplying one or more products to an evacuation chamber, evacuating oxygen from the chamber for deoxygenating the chamber and the product or products, injecting a protective gas into the chamber to replace at least part of the oxygen evacuated from the product and chamber with protective gas, and transferring the products to a packing unit and sealing each one in a package.

The present invention provides a method for packing food products, which makes the capacity of the packing unit independent of the capacity of the deoxygenating process. Consequently, it is possible in accordance with the invention to supply deoxygenated products to the packing unit at a rate which matches the packing cycles rate of the packing unit. This separate deoxygenating process allows oxygen sensitive products to be packed in high speed packing machines such as a flow-wrap packing machine having generally about about 80 packing cycles/min.

Consequently, it is preferable that the products are supplied to the evacuation chamber in batches of products, and the batch is transferred to the packing unit, while the products are packed individually or in groups while the remaining part of the batch is allowed to pause outside the packing unit. This may conveniently be done so that the transferring of products into the packing unit is such that the introduction of the products individually or in groups matches the packing cycles of the packing unit.

In the present context, a protective gas is an inert gas, with nitrogen and carbon dioxide being the most common. The suitable evacuation will depend on the structure of products to be packed. For dough products evacuation or vacuum treatment to 70 to 80% (evacuation to 100% being vacuum) is appropriate, preferably at about 75%. For meat products such as sliced ham an evacuation to 90% or more may be desirable. The evacuation of the chamber is conveniently carried out by way of a vacuum pump.

Furthermore, according to the invention it has surprisingly been realized that by deoxygenating the product by withdrawing air from it and subsequently replacing the evacuated oxygen with a protective gas, it is possible to subject such a modified product to normal atmosphere for a limited period without the gas diffusing and oxygen level substantially increasing. For example, for fresh or uncooked dough products a pausing time in normal atmosphere may be e.g. from 1 to 4 min.

Therefore, it is possible to transfer the products in the batch into a packing unit by feeding one or more of the products individually or in groups into the packing unit while allowing the remaining products of the batch to pause outside the packing unit. For products which have good gas retainabilities such as dough based products, see example below, the products may pause while awaiting their turn to be packed or be transferred to the packing unit in normal atmosphere.

For food products wherein the protective gas tends to diffuse from the product following end exposure of gas, so as to once again leave the place for oxygen at a rate so high that the speed of the packing unit is not sufficient to retain a desirable level of deoxygenating of the product, it may be desirable to protect the products with a modified atmosphere while they are pausing in front of the packing unit or during the transition. Such precautions may e.g. be met by passing the products through a tunnel with a modified atmosphere. This may be appropriate for products such as compact meat products.

In this method it is preferred that the products individually or in groups are inserted into packages having one or more openings through which protective gas is injected or flushed through the package before it is sealed off. Advantageously, this is done so as to replace substantially all of the air in the package. In one embodiment of the invention, the product or products is/are packed in packages having one opening or mouth for receiving both the product or products and the protective gas, and through which the air in the package can escape.

The protective gas may be injected while the product or products is/are introduced into the package. It may, however, be advantageous to allow the protective gas to flush through the package until it is sealed off.

Conveniently, the products are introduced individually or in groups into a tube closed at one end and shaped from a reel of sheet material e.g. flexible plastic foil which is welded or sealed together along a longitudinal seam running in the processing direction. Such packages may be produced in a conventional flow-wrap (also known as form-fill-seal) machine. In such a machine the products are normally introduced through a mandrel around which the tube is shaped. See below for further discussion in relation to the apparatus according to the invention.

Another method according to the invention relates to deoxygenating a food product for packing. This method comprises supplying one or more products to an evacuation chamber, evacuating oxygen from the chamber for deoxygenating the chamber and the product or products, injecting protective gas into the chamber to replace at least part of the oxygen evacuated from the product and chamber with protective gas. The products treated according to this method may be stored e.g. in a modified atmosphere in batches and later packed.

In a second aspect, the invention relates to an apparatus for deoxygenating a food product comprising an evacuation chamber comprising a means for evacuating oxygen from the chamber for deoxygenating the chamber and product or products therein, injecting means to inject protective gas into the chamber to replace at least part of the oxygen evacuated from the chamber and product or products, conveying means to convey the product or products to and from an evacuation chamber, and transferring the products into a packing unit.

In a preferred embodiment of the invention the conveyor means is adapted to advance batches of products to and from the evacuating chamber and transfer the products individually or in groups to the packing unit while allowing the remaining part of a treated product batch to pause outside the packing unit. This allows a continuous in-feed and high speed packing of the products as discussed above.

The conveying means and the evacuating chamber may be separate units. However, it may be preferred that the apparatus also comprises the packing unit.

In a further aspect, the invention relates to a deoxygenated food package comprising a flexible pouch which contains a deoxygenated product wherein least part of the oxygen in the product has been replaced by protective gas, and a head space comprising a protective gas, and wherein the flexible pouch is not sucked to or upon the product. This food package overcomes the difficulties known in connection with opening of vacuum packed products due to the packing material tightly abutting the product. The food package of the invention allows an easy opening and access to the food product by simply piercing the pouch. As mentioned above, the package also is desirable from a costs and environmental point of view. The food package may be manufactured according to the method and with the apparatus of the invention.

It should be understood that the present invention is not limited to decreasing the oxygen level in food packages. The method and apparatus of the invention may also be adapted to delimit the effect of other undesirable gases in food packages.

BRIEF DESCRIPTION OF THE DRAWINGS

The invention will now be further described with reference to the accompanying drawings illustrating a preferred embodiment of the apparatus and method of the invention by way of example only, and wherein FIG. 1. is a schematic illustration of an apparatus according to the invention carrying out the method according to the invention.

DETAILED DESCRIPTION OF THE DRAWINGS

Figure 1:
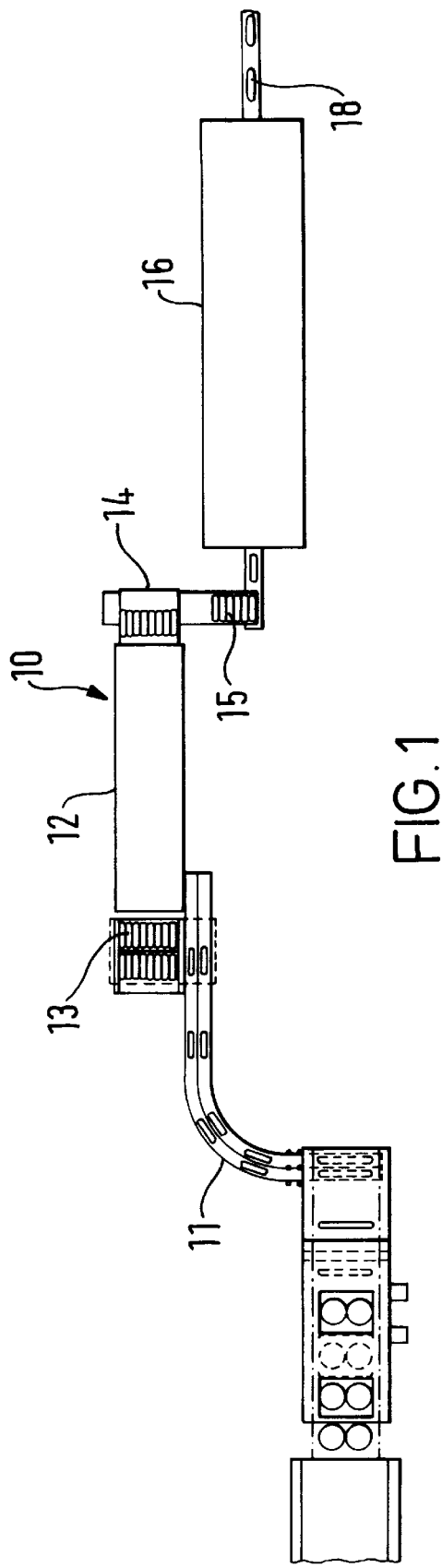

FIG. 1 shows an apparatus 10 for deoxygenating a food product and packing. The apparatus 10 comprises conveying means in the form of an in-feed conveyor 11 feeding a batch of rolled products 13 into an evacuation chamber 12. In this chamber 12, the air is removed therefrom by means of a source of vacuum, not shown in the drawings, which reduces the pressure in the chamber and deoxygenates the chamber 12 and the products 13. The apparatus 10 also comprises injecting means to inject protective gas into the chamber 12. A second conveyor 14 transfers the rolled products 13 from the chamber 12 to a waiting position 15 where the products 13 pause until they are transferred to the packing unit. The evacuating of the chamber 12 and the number of products therein are preferably adjusted so that the products are fed in a continuous flow to the packing unit.

Figure 2:
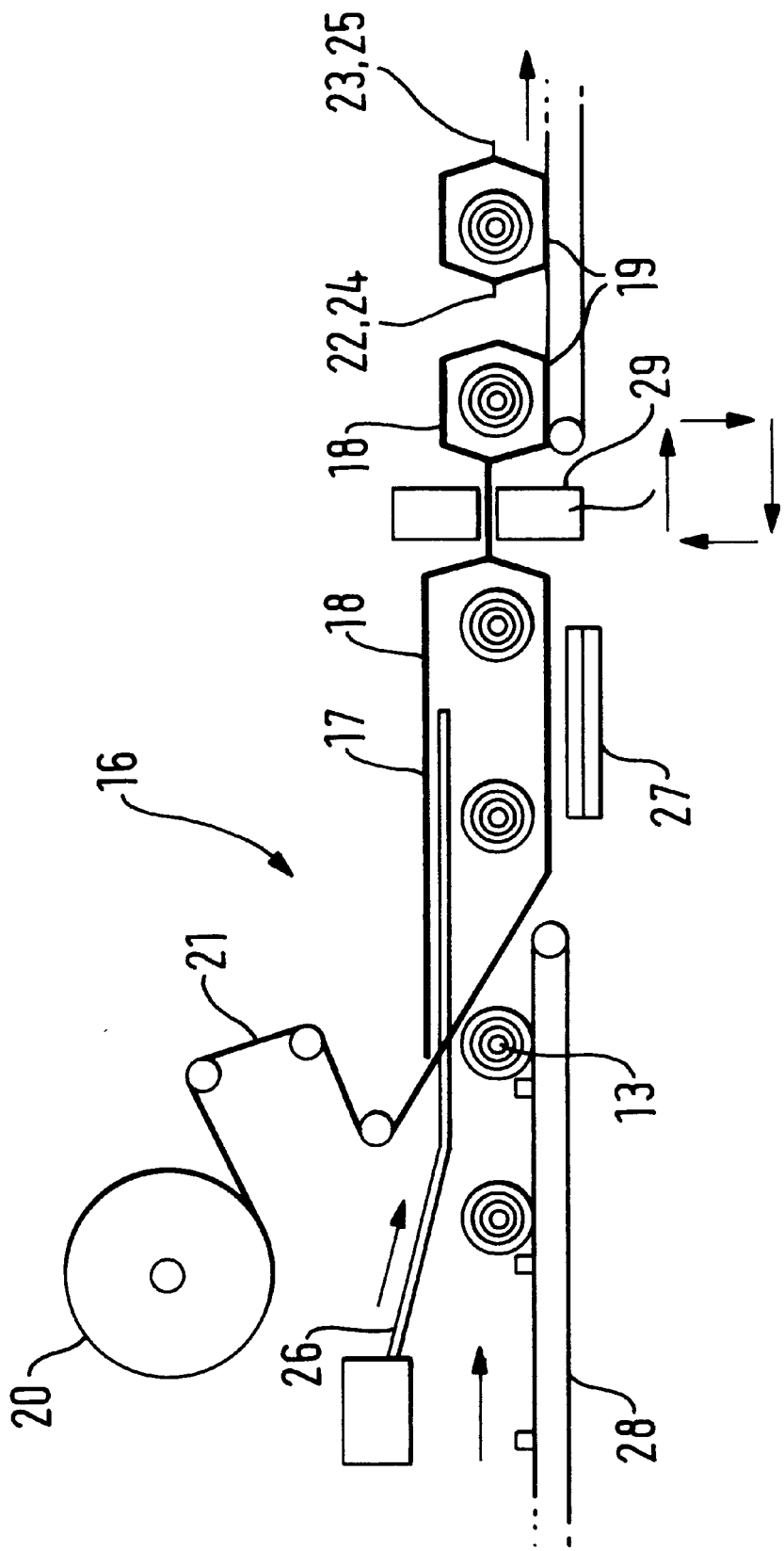
FIG. 2 is a schematic illustration of a flow-packing unit.

A suitable packing unit may be a flow-wrap packing unit as discussed above, such a unit is illustrated in FIG. 2. Such a flow-wrap packing unit 16 may be of conventional type. The herein illustrated machine is of horizontal type but vertical packing machines may also be used if appropriate for the product to be packed.

The flow-wrap unit 16 wraps individually the products supplied by a conveyor 28. This packing unit 16 comprises a mandrel 17 around which a tubular package 18 having a longitudinal seam 19 is formed by means of rotating sealing tools 27 from sheet material 21 which is supplied from a reel 20. The tubular package 18 is closed at both ends 22 and 23 by means of sealing tools 29 creating seams 24 and 25 running transverse to the longitudinal seam 19.

For flushing of the package with a protective gas before, during or after introduction of the product or products therein, the flow-wrap unit comprises injector means comprising an injector lance 26 injecting protecting gas into the package 18. The lance is projected into the tube of film, above the product and thus in use blows gas into the package 18 and forces air out in a direction opposite the injection.

EXAMPLE

An illustration of the invention is given by way of a trial: A batch of rolled pizza dough products were evacuated to 75%, and then gas flushed with protective gas: $CO_2$ and $N_2$ 50/50. The products were then transferred to the flow wrap unit where they paused outside in normal atmosphere. One after the other the rolled dough products were packed and sealed while being gas flushed with the same protective gas as mentioned above.

After 24 hours the head space in the packs were analyzed. The remaining oxygen value was 0.2%. Similar packed rolled dough products which had not been subjected to the evacuation were found to contain oxygen up to 1%. As a comparison a package comprising fresh dough must not comprise more than an oxygen value of 0.5% if the package is to be stored refrigerated 4 to 5 weeks. It follows that the non-evacuated samples provide an unsatisfactory result for the present purpose.

What is claimed is:

1. A method for deoxygenating and packing dough pieces which comprises:
   providing fresh or uncooked dough is capable of being packed individually or in groups,
   supplying the dough pieces batchwise to an evacuation chamber as batches of dough pieces,
   applying vacuum to the chamber for deoxygenating the chamber and dough pieces therein,
   injecting an inert, protective gas into the chamber such that at least part of the oxygen that has been evacuated from the chamber and dough pieces is replaced by the inert protective gas,
   transferring the deoxygenated and inert gassed batches of dough pieces from the evacuation chamber across a zone that is at ambient atmosphere to a form-fill-seal packing unit such that the dough pieces pass from the evacuation chamber to the packing unit while exposed to the ambient atmosphere, and then
   sealing the dough pieces individually or in groups in a package In the form-fill-seal packing unit under an inert gas protective atmosphere;
   wherein said infecting of said inert gas is sufficient to replace evacuated oxygen with the inert protective gas in the dough pieces such that the dough pieces in the transferring step are allowed to pause in the ambient atmosphere, and such that the introduction of the dough pieces individually or in groups matches the packaging cycles of the packing unit.

2. A method according to claim 1, wherein the dough pieces, individually or in groups, are inserted in the packing unit into packages having one or more openings through which inert protective gas is injected before the package is sealed.

3. A method according to claim 2, wherein the inert protective gas replaces substantially all of the air in the package.

4. A method according to any claim 2, wherein the inert protective gas and the dough pieces is/are introduced through the same opening in the package.

5. A method according to any of claim 2, wherein the inert protective gas is injected as the dough pieces are introduced into the package.

6. A method according to any of claim 1, wherein the dough pieces products individually or in groups are introduced in the packing unit into a tube closed at one end and shaped from a reel of sheet material.

7. Method according to claim 1, wherein the packing unit includes a mandrel around which tubular packages are formed from a sheet material.

8. Method according to claim 7 wherein the packing unit is provided with injector means for injecting the inert protective gas into the package.

9. Method according to claim 7 wherein the packing unit is part of a single apparatus which includes the evacuation chamber, conveying means and means for injecting the inert protective gas into the chamber.

10. The method of claim 1, wherein the dough pieces are supplied to the evacuation chamber and transferred to the packing unit along a substantially horizontal plane.

11. The method of claim 1, wherein the dough pieces are supplied to the evacuation chamber and transferred to the packing unit by a conveyer.

* * * * *

UNITED STATES PATENT AND TRADEMARK OFFICE
CERTIFICATE OF CORRECTION

PATENT NO. : 6,123,969

DATED : September 26, 2000

INVENTORS : Sjöberg

It is certified that errors appear in the above-identified patent and that said Letters Patent is hereby corrected as shown below:

Claim 1, column 5, line 27: delete "is" and insert --pieces --.

Signed and Sealed this

Seventeenth Day of April, 2001

Attest:

NICHOLAS P. GODICI

*Attesting Officer*   *Acting Director of the United States Patent and Trademark Office*